United States Patent [19]
Fehlhaber

[11] Patent Number: 5,887,779
[45] Date of Patent: Mar. 30, 1999

[54] SOLDER SLEEVE HAVING IMPROVED HEAT TRANSFER CHARACTERISTICS AND METHOD THEREFOR

[75] Inventor: Gene L. Fehlhaber, Cave Creek, Ariz.

[73] Assignee: Phoenix Logistics, Inc., Phoenix, Ariz.

[21] Appl. No.: 837,870

[22] Filed: Apr. 25, 1997

[51] Int. Cl.⁶ ...................................................... H01R 4/02
[52] U.S. Cl. ........................... 228/216; 228/255; 228/56.3
[58] Field of Search ..................... 228/135, 138, 228/215, 216, 255, 56.3; 174/DIG. 8, 84 R, 93; 29/828, 868, 872; 403/273

[56] References Cited

U.S. PATENT DOCUMENTS

| | | | |
|---|---|---|---|
| 4,505,421 | 3/1985 | Gen et al. | 228/224 |
| 4,563,224 | 1/1986 | Gen et al. | 148/23 |
| 4,667,869 | 5/1987 | Gen et al. | 228/224 |
| 4,688,713 | 8/1987 | Gen et al. | 228/224 |
| 4,809,901 | 3/1989 | Gen et al. | 349/194 |
| 5,093,545 | 3/1992 | McGaffigan | 228/56.3 |
| 5,221,815 | 6/1993 | Bostock et al. | 174/DIG. 8 |
| 5,579,575 | 12/1996 | Lamome et al. | 228/227 |

*Primary Examiner*—Samuel M. Heinrich
*Attorney, Agent, or Firm*—Harry M. Weiss; Jeffrey D. Moy; Harry M. Weiss & Associates, P.C.

[57] ABSTRACT

A high performance soldering sleeve having improved heat transfer characteristics. The soldering sleeve has a continuous winding of solder coils positioned within a heat shrinkable tubular member. The solder coils, having a proper flux to solder ratio which increases performance of the soldering sleeve by generating a better solder flow. The solder coils also have better heat adsorption and heat transfer characteristics than prior art solid solder inserts. The solder coils further have the advantage of forming a plurality of lines which provide a fail safe configuration as a visual cue to indicate when a proper amount of heat has been applied to the soldering sleeve.

22 Claims, 1 Drawing Sheet

SOLDER SLEEVE HAVING IMPROVED HEAT TRANSFER CHARACTERISTICS AND METHOD THEREFOR

BACKGROUND OF THE INVENTION

1. Field of the Invention

This invention relates generally to connectors and, more specifically, to a high performance soldering sleeve having improved heat transfer characteristics and method therefor.

2. Description of the Prior Art

During the mid 1960's, RAYCHEM CORPORATION invented the first soldering sleeve. The soldering sleeve was comprised of a heat shrinkable tube with a solder preform inside. The soldering sleeve found immediate and widespread acceptance throughout the aerospace industry. However, the soldering sleeve had one major problem. It was difficult for people who used the soldering sleeve to control the heating process to assure that excessive heat was not applied to the soldering sleeve. Excessive heat compromises the dielectric properties of the wire insulation and/or causes burned solder joints.

In the mid 1970's RAYCHEM CORPORATION made improvements to the original soldering sleeve invented in the mid 1960's. The solder preform of the original soldering sleeve was replaced with a combination of two solders which formed a bi-alloy solder ring. Each of the two solders had a different melting point. The bi-alloy solder ring was suppose to give the assembly technician using the soldering sleeve a visual cue in applying the proper amount of heat.

The 1970's improvements to the soldering sleeve provided only a marginal amount of help to the assembly technician in applying the proper amount of heat. Thus, during the 1980's RAYCHEM CORPORATION invented a thermochromic ink addition to the outside of the solder preform. The thermochromic ink ring led to a plurality of patents: U.S. Pat. No. 4,505,421; U.S. Pat. No. 4,563,224; U.S. Pat. No. 4,667,869; U.S. Pat. No. 4,688,713; and U.S. Pat. No. 4,809,901. The thermochromic ink ring was designed to undergo a change of color at the temperature required to effect a solder termination. While the thermochromic ink ring performed significantly better than the bi-alloy solder ring, it still leaves much to be desired as an effective visual indicator of soldering reliability.

The basic problem with present soldering sleeves is derived from the fact that the heat is, of necessity, externally applied. In an ideal soldering application using MIL-STANDARD 2000 ground rules, the heat would be applied to the inner wire or braid and the solder would be drawn to the heat. In this scenario, the thermochromic ink ring could function as a good indicator of proper heat content at the solder joint, as the lower metal layer would be at the proper eutectic temperature. However, all soldering sleeves must be larger than the wire package to facilitate assembly. This clearance negatively affects the amount of heat effectively transferred from the external source to the inner metal layer. Therefore, the thermochromic ink ring will often indicate a higher temperature than the lower metal layer. Thus, one runs the risk of reading a "false positive", and thereby misjudging the actual quality of the solder joint wetting.

Therefore, a need existed to provide an improved soldering sleeve. The improved soldering sleeve must improve the heat transfer characteristics of previous soldering sleeves. The improved soldering sleeve must be able to absorb heat at a faster rate than previous soldering sleeves thereby reducing the total amount of time that an external heat source needs to be applied for the solder joint to reach an eutectic temperature. The improved soldering sleeve must provide a visual cue to show that proper wetting has been obtained and that the external heat source may be removed.

SUMMARY OF THE INVENTION

In accordance with one embodiment of the present invention, it is an object of the present invention to provide an improved soldering sleeve.

It is another object of the present invention to provide an improved soldering sleeve that has better heat transfer characteristics than previous soldering sleeves.

It is another object of the present invention to provide an improved soldering sleeve that is able to absorb heat at a faster rate than previous soldering sleeves thereby reducing the total amount of time that an external heat source needs to be applied for the solder joint to reach an eutectic temperature.

It is still another object of the present invention to provide an improved soldering sleeve that provides a visual cue to show that proper wetting has been obtained and that the external heat source may be removed.

BRIEF DESCRIPTION OF THE PREFERRED EMBODIMENTS

In accordance with one embodiment of the present invention, a high performance soldering sleeve having improved heat transfer characteristics is disclosed. The soldering sleeve has a heat shrinkable tubular member. A continuous winding of wire solder is positioned within the heat shrinkable tubular member.

In accordance with another embodiment of the present invention, a method of providing a high performance soldering sleeve having improved heat transfer characteristics is disclosed. The method comprises the steps of: providing a heat shrinkable tubular member; and providing a continuous winding of wire solder positioned within the heat shrinkable tubular member.

In accordance with another embodiment of the present invention, a method of soldering at least two solderable elongated substrates is disclosed. The method comprises the steps of: providing a soldering sleeve wherein the soldering sleeve comprises the steps of: providing a heat shrinkable tubular member; and providing a continuous winding of flux-filled wire solder positioned within the heat shrinkable tubular member wherein the continuous winding of wire solder forms a plurality of lines which are used as a heat indicator; positioning the substrates within the soldering sleeve; heating the soldering sleeve causing the heat shrinkable tubular member to contract; and continuing to heat the soldering sleeve until each of the plurality of lines of the continuous winding of flux-filled wire solder disappears to form a solid mass of solder to indicate that a sufficient amount of heat has been applied to the soldering sleeve.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
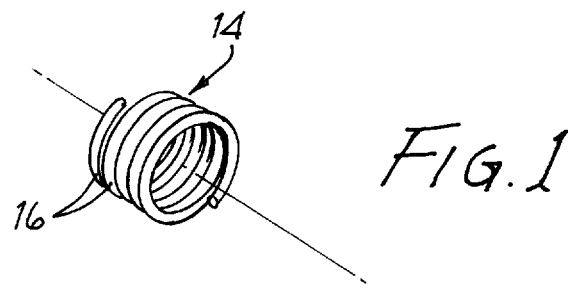
FIG. 1 shows an elevated perspective view of a continuous winding of wire solder used in the present invention.
Figure 2:
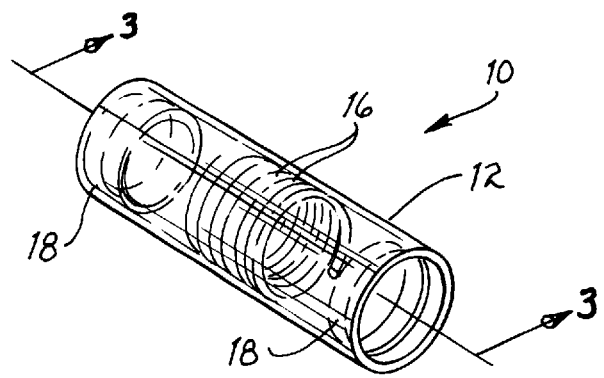
FIG. 2 shows an elevated perspective view of the soldering sleeve of the present invention.
Figure 3:
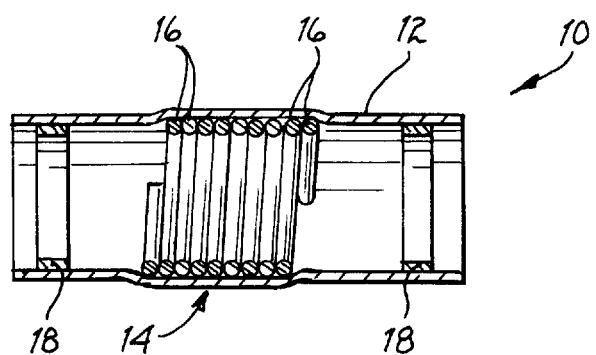
FIG. 3 shows a cross-sectional side view of the soldering sleeve depicted in FIG. 2 taken along lines 3—3.

Referring to FIGS. 1–3 wherein like numeral and symbols represent like objects, the soldering sleeve 10 of the present invention is shown. The soldering sleeve 10 is comprised of two main components: a tubular member 12 and a continuous winding of wire solder 14.

The tubular member 12 is generally a heat shrinkable tubular sleeve 12. The heat shrinkable tubular sleeve 12 is capable of undergoing dimensional changes (i.e., contracts in size) when heat is applied. The heat shrinkable tubular sleeve 12 is generally made of a polymeric material exhibiting the properties of elastic or plastic memory. In the preferred embodiment of the present invention, the heat shrinkable tubular sleeve 12 is made of a polyvinylidene fluoride material.

The heat shrinkable tubular sleeve 12 should be relatively thin in order for the soldering sleeve 10 to have the best heat transfer characteristics. The soldering sleeve should also be fairly transparent. The transparency is required so that an individual using the soldering sleeve may observe visual indicators, which will be described below, which will inform the individual when a sufficient amount of heat has been applied to the soldering sleeve 10 to cause the solder joint to reach an eutectic temperature.

A solder insert 14 is place within the heat shrinkable tubular sleeve 12. The solder insert 14 is generally a continuous winding of concentric solder coils 14 positioned within the heat shrinkable tubular member 12. In the preferred embodiment of the present invention, the continuous winding of concentric solder coils 14 is a special wound construction of flux-filled wire solder coils 14 (hereinafter solder coils 14). The solder coils 14 have a predetermined proper ratio of flux to solder volume. This allows the solder coils 14 to perform better that prior art solder inserts which have an external layer of power flux which has been mixed with the thermochromic ink. The flux aids in the flow of the solder when an external heat source is applied to the soldering sleeve 10. The flux also cleans the surface of the substrates to be joined. In use, the flux melts, flows and covers the substrate at a temperature below the melting point of the solder.

The solder coils 14 offers several other advantages over the use of prior art solder inserts. The solder coils 14 offer a major increase in surface area over the cylindrical preforms used in the prior art. In accordance with the preferred embodiment of the present invention, the solder coils 14 have 36% more heat absorbing surface area than prior art cylindrical solder preforms. Thus, the solder coils 14 are able to absorb heat from an external source at a much faster rate than prior art solder inserts. This effectively reduces the total amount of time that the external heat source needs to be applied to the soldering sleeve 10 before the solder coils 14 reach eutectic temperatures. This reduces the chances of overheating the solder joint.

The solder coils 14 also increase the heat transfer characteristics of the shrinkable tubular member 12. The solder coils 14 are non-rigid and malleable. Thus, the solder coils 14 offer significantly less resistance to the compressive axial forces applied to the solder coils 14 by the shrinkable tubular member 12 when the external heat source is first applied to the soldering sleeve 10. This allows early contact and resultant heat transfer to the inner metal layers of the solder coils 14 thereby yielding a reduction in the amount of time of exposure of the soldering sleeve 10 to the external heat source.

The configuration of the solder coils 14 offers an effective visual cue to the assembly technician that a proper amount of heat has been applied to the soldering sleeve 10. Since the solder coils 14 are a continuous winding of concentric solder coils, the solder coils 14 form a plurality of lines 16. When the assembly technician applies the external heat source, the solder coils 14 will begin to melt. The assembly technician may readily watch as the lines 16 disappear between adjacent solder coils 14. When all of the plurality of lines 16 have disappeared, a solid mass of solder will form showing that proper wetting has been obtained and that the external heat source may be removed.

On each side of the solder coils 14 is a sealing ring 18. The sealing rings 18 are used to environmentally seal the solder joint. In the preferred embodiment of the present invention, the sealing rings 18 are comprised of a meltable thermoplastic material. When heat is applied to the soldering sleeve 10, the tubular member 12 will begin to shrink to mechanically protect and strain relieve the splice. The sealing rings 18 will also begin to melt and environmentally seal the wire splice. Thus, the sealing rings 18 will prevent water and other contaminants from interfering with the wire splice.

As can be seen from the above discussion, the soldering sleeve 10 of the present invention offers several distinct advantages over prior art soldering sleeves. Specifically, the solder coils 14, having a proper flux to solder ratio and conventional rather than powder flux, increases performance by allowing a better flow of the solder. The solder coils 14 also have better heat absorption and heat transfer characteristics than prior art solid solder inserts. Furthermore, the plurality of lines 16 formed by the solder coils 14 provide a visual cue to indicate to an assembly technician that a proper amount of heat has been applied to the soldering sleeve 10.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A high performance soldering sleeve having improved heat transfer characteristics comprising, in combination:
    a heat shrinkable tubular member; and
    a continuous winding of wire solder positioned within said heat shrinkable tubular member.

2. A high performance soldering sleeve in accordance with claim 1 wherein said heat shrinkable tubular member is made of a polyvinylidene fluoride material.

3. A high performance soldering sleeve in accordance with claim 1 wherein said continuous winding of wire solder is a continuous winding of flux-filled wire solder.

4. A high performance soldering sleeve in accordance with claim 1 wherein said continuous winding of wire solder forms a plurality of lines which are used as a heat indicator wherein each of said plurality of lines will disappear to form a solid mass of solder to indicate that a sufficient amount of heat has been applied to said soldering sleeve.

5. A high performance soldering sleeve in accordance with claim 1 wherein said continuous winding of wire solder increases heat transfer characteristics of said soldering sleeve by generating less resistance to compressive axial forces applied to said continuous winding of wire solder by said heat shrinkable tubular member when heat is applied to said heat shrinkable tubular member and said heat shrinkable tubular member begins to shrink.

6. A high performance soldering sleeve in accordance with claim 1 wherein said continuous winding of wire solder increases heat transfer characteristics of said soldering sleeve by absorbing heat at a faster rate due to an increase in surface area thereby reducing an amount of time that a heat source must be applied for said continuous winding of wire solder to reach an eutectic temperature.

7. A high performance soldering sleeve in accordance with claim 1 further comprising sealing rings positioned within said heat shrinkable tubular member and on each end of said continuous winding of wire solder positioned within said heat shrinkable tubular member for environmentally sealing a solder joint formed when said high performance soldering sleeve is heated.

8. A high performance soldering sleeve in accordance with claim 7 wherein said sealing rings are made of a meltable thermoplastic.

9. A high performance soldering sleeve having improved heat transfer characteristics comprising, in combination:

a heat shrinkable tubular member;

a continuous winding of flux-filled wire solder positioned within said heat shrinkable tubular member wherein said continuous winding of wire solder forms a plurality of lines which are used as a heat indicator wherein each of said plurality of lines will disappear to form a solid mass of solder to indicate that a sufficient amount of heat has been applied to said soldering sleeve; and sealing rings positioned within said heat shrinkable tubular member and on each end of said continuous winding of flux-filled wire solder positioned within said heat shrinkable tubular member for environmentally sealing a solder joint formed when said high performance soldering sleeve is heated.

10. A high performance soldering sleeve in accordance with claim 9 wherein said heat shrinkable tubular member is made of a polyvinylidene fluoride material.

11. A high performance soldering sleeve in accordance with claim 9 wherein said continuous winding of wire solder increases heat transfer characteristics of said soldering sleeve by generating less resistance to compressive axial forces applied to said continuous winding of wire solder by said heat shrinkable tubular member when heat is applied to said heat shrinkable tubular member and said heat shrinkable tubular member begins to shrink.

12. A high performance soldering sleeve in accordance with claim 9 wherein said continuous winding of wire solder increases heat transfer characteristics of said soldering sleeve by absorbing heat at a faster rate due to an increase in surface area thereby reducing an amount of time that a heat source must be applied for said continuous winding of wire solder to reach an eutectic temperature.

13. A high performance soldering sleeve in accordance with claim 9 wherein said sealing rings are made of a meltable thermoplastic.

14. A method of providing a high performance soldering sleeve having improved heat transfer characteristics comprising the steps of:

providing a heat shrinkable tubular member; and providing a continuous winding of wire solder positioned within said heat shrinkable tubular member.

15. The method of claim 14 wherein said step of providing heat shrinkable tubular member further comprises the step of providing a heat shrinkable tubular member made of a polyvinylidene fluoride material.

16. The method of claim 14 wherein said step of providing continuous winding of wire solder further comprises the step of providing a continuous winding of flux-filled wire solder.

17. The method of claim 14 wherein said step of providing continuous winding of wire solder further comprises the step of providing continuous winding of wire solder which forms a plurality of lines which are used as a heat indicator wherein each of said plurality of lines will disappear to form a solid mass of solder to indicate that a sufficient amount of heat has been applied to said soldering sleeve.

18. The method of claim 14 wherein said step of providing continuous winding of wire solder further comprises the step of providing continuous winding of wire solder which increases heat transfer characteristics of said soldering sleeve by generating less resistance to compressive axial forces applied to said continuous winding of wire solder by said heat shrinkable tubular member when heat is applied to said heat shrinkable tubular member and said heat shrinkable tubular member begins to shrink.

19. The method of claim 14 wherein said step of providing continuous winding of wire solder further comprises the step of providing continuous winding of wire solder which increases heat transfer characteristics of said soldering sleeve by absorbing heat at a faster rate due to an increase in surface area thereby reducing an amount of time that a heat source must be applied for said continuous winding of wire solder to reach an eutectic temperature.

20. The method of claim 14 further comprising the step of providing sealing rings positioned within said heat shrinkable tubular member and on each end of said continuous winding of wire solder positioned within said heat shrinkable tubular member for environmentally sealing a solder joint formed when said high performance soldering sleeve is heated.

21. The method of claim 20 wherein said step of providing sealing rings further comprises the step of providing sealing rings which are made of a meltable thermoplastic.

22. A method of soldering at least two solderable elongated substrates comprising the steps of:

providing a soldering sleeve wherein said soldering sleeve comprises the steps of:
  providing a heat shrinkable tubular member; and
  providing a continuous winding of flux-filled wire solder positioned within said heat shrinkable tubular member wherein said continuous winding of wire solder forms a plurality of lines which are used as a heat indicator;

positioning said substrates within said soldering sleeve;

heating said soldering sleeve causing said heat shrinkable tubular member to contract; and continuing to heat said soldering sleeve until each of said plurality of lines of said continuous winding of flux-filled wire solder disappears to form a solid mass of solder to indicate that a sufficient amount of heat has been applied to said soldering sleeve.

* * * * *